May 19, 1964 G. BETTERMANN ET AL 3,134,010
METHOD FOR CUTTING WORKPIECES
Filed Aug. 29, 1961 2 Sheets-Sheet 2
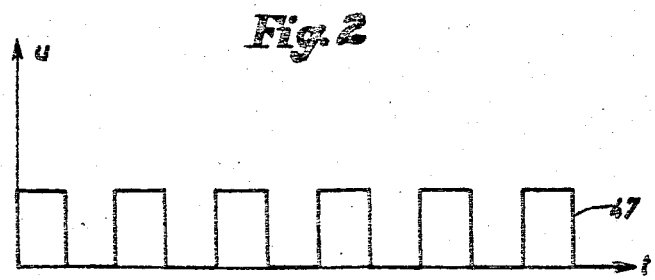
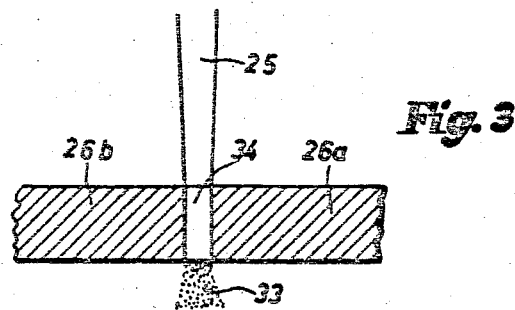
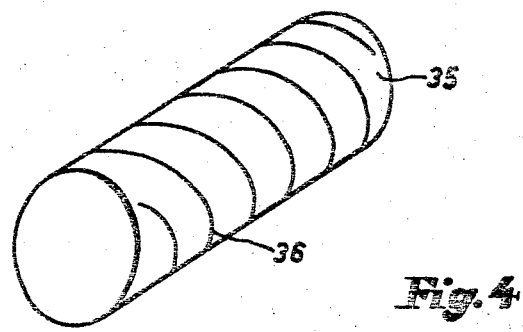
INVENTOR.
BY Georg Bettermann
and
Wolfgang Opitz

United States Patent Office 3,134,010
Patented May 19, 1964

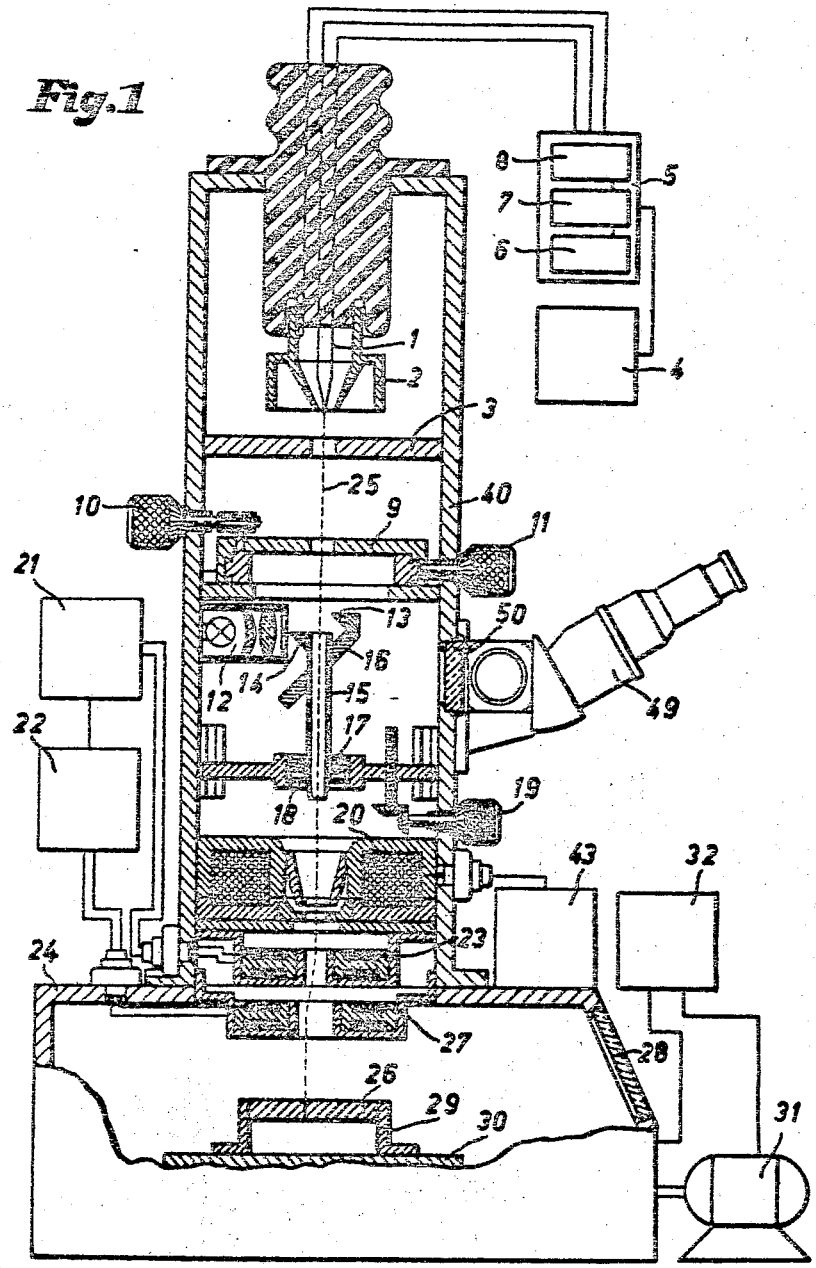

3,134,010
METHOD FOR CUTTING WORKPIECES
Georg Bettermann, Wasseralfingen, Wurttemberg, and Wolfgang Opitz, Aalen, Wurttemberg, Germany, assignors, by mesne assignments, to United Aircraft Corporation, East Hartford, Conn., a corporation of Delaware
Filed Aug. 29, 1961, Ser. No. 134,723
Claims priority, application Germany Mar. 3, 1961
8 Claims. (Cl. 219—69)

This invention relates to improved method and means for cutting workpieces along preselected perambulating paths by means of a focussed beam of charge carriers of high energy density.

In the industrial working of metal sheets, for instance in the automobile industry and in aviation construction, it is often necessary to cut sheets consisting of material which is difficult to work along perambulating cutting lines. In the construction of machine tools, it is frequently necessary to cut parts of hardened steel or hard metal, such as carbide, for parts of tools or punch cuts. In such applications, the thickness of the material usually ranges from 0.5 to a few millimeters. In the cutting itself, high cutting speeds are desirable in order to obtain a rational manufacture compatible with normal production speeds and economy requirements.

Cutting with shears of various types, either piece by piece or continuously (as is customary in most cases) is limited for rational use substantially to straight cutting lines, and to the cutting of material which is not too hard.

Cutting of curved work pieces is generally performed using gas cutting torches with an oxidizing flame. The use of this method is also limited. For instance, even the customary chrome-nickel steels are considered difficult to cut and very rough cut lines are obtained by torch cutting of these steels. Many materials, particularly cemented metal carbides, cannot be cut by this method. Another disadvantage of this method of cutting is that the heat at the cut is conducted very far into the material subjecting a large region of the material around the point of cutting to very high thermal stresses.

Cutting by means of spark erosion or ultrasonics is also known. The first of these methods is limited to electrically conductive materials. Both of the methods are relatively slow and cannot be used for rapid cutting of long cutting lengths.

It is also known to mill holes of any desired shape in workpieces by means of a beam of charge carriers which is preferably intermittently controlled. It is also possible to apply this method in such a manner that cut lines of large length are produced. In this method, the material is evaporated along the cutting line and the vapor moves away in direction substantially opposite the direction of the beam of charge carriers from the unheated material. By suitable adjustment of the beam of pulses employed, the milling process is controlled in such a manner that despite the high temperature of evaporation at the working point, the melting effect in its vicinity is maintained small.

The method described has proven particularly valuable for the working of material of small dimensions with a high degree of precision and particularly with little effect on the adjoining material. For rapid working of thicknesses of material of up to a few millimeters, as is required in connection with the problem which forms the basis of the present invention, the type of removal of material described is less well suited.

It is also known to weld by means of a beam of charge carriers forcussed on the material which acts continuously or intermittently. In this connection, the intensity of the beam of charge carriers can be so high that the beam at the point of impingement penetrates deep into the material, forming a narrow, highly heated zone and along the depth of penetration gives up its energy to the material, melting the latter. Upon the movement of the beam of charge carriers relative to the workpiece, the material which has liquified in the zone of penetration of the beam solidifies and an excellent weld is formed.

However, the material melted remains in the cavity and resolidifies and this method is not suitable for cutting.

It is, therefore, one object of this invention to provide an improved method and means for cutting material by an impinging beam of charge carriers in which the beam intensity is regulated to penetrate through the material, melting the material, and the melted material is ejected in the form of droplets in the direction of the impinging beam.

It is a further object of this invention to provide an improved method and means for cutting material by a penetrating beam of charge carriers in which the beam is pulsated to augment the discharge of melted material.

Briefly, the present invention relates to a method of cutting workpieces in which a beam of charge carriers of high intensity is directed against the workpiece and removed relative to the latter in the cutting direction. The intensity of this beam of charge carriers is maintained sufficiently high so that the beam penetrates completely through the material, forming a narrow, highly heated zone, in which the material is liquefied and partly evaporated in the central position of said zone. By the expansion of vapour bubble inside the melted zone the liquid material is vigorously ejected out of said zone in the direction of the penetrating beam. The liquefied material is sprayed out of the melted zone in a jet of droplets leaving a cut gap in the material. The edges of said cut gap are substantially parallel.

In contradistinction to the milling by means of a beam of charge carriers which was described above, the metal in the case of the new cutting process is removed in liquid condition. The evaporation, which also takes place to a small extent, upon the working is completely incidental. The cutting speed obtainable with the new cutting process is high and amounts for instance to about 10 to 20 mm. per second when cutting a steel sheet of a thickness of 1 mm. In contradistinction to this, in the aforementioned milling by means of a beam of charge carriers, there are obtained merely cutting speeds of about 1 mm. per second in the case of steel sheet of a thickness of 1 mm.

A cutting action can be obtained even with a continuous beam of high energy density.

However, the result which can be obtained when using a pulse-modulated beam of charge carriers of high pulsing ratio is decisively better. In this connection, the duration of the pulses and of the pauses between the pulses is advantageously the same, i.e., a ratio between the pulse period and the cycle of 1:2 is employed. A cut produced by means of an intermittently controlled or pulsed beam of charge carriers has substantially smoother cut surfaces than a cut which is made with the use of a continuous beam. Furthermore, when using an intermittently controlled beam of charge carriers, the speed of cutting can be increased substantially. Thus, for instance, a steel sheet of a thickness of 1 mm. can be cut with a cutting speed of 20 mm. per second by a beam of charge carriers having an acceleration voltage of 145 kv. and a pulsated current of 10 milliamperes.

Experiments have shown that optimum conditions are present when using a pulse-controlled beam of charge carriers of a pulsing ratio of 1:2, the duration of the pulse being between $10^{-2}$ and $10^{-4}$ seconds, preferably about $10^{-3}$ seconds. These operating conditions which are described here as optimum are to be understood, however, to be merely an example, since they depend on the nature of the material being worked.

In a new cutting process, the beam of charge carriers is advantageously so shaped that the point of narrowest cross-section of the beam is located slightly above the surface of the workpiece. If the work spacing, i.e., the free path between the surface of the workpiece and the lower edge of the focusing lens is for instance 60 mm., then this lens is so adjusted that the point of narrowest cross-section of the beam is about 10 mm. above the surface of the workpiece.

In order to produce curved cut lines of limited length, the beam of charge carriers is preferably moved over a stationary workpiece. Conventional deflection circuits energized by currents of suitable wave shape may be employed for beam deflection over the stationary workpiece. In many cases, it may also be advisable not to deflect the beam of charge carriers, but merely to move the workpiece. In such applications, the movement of the table bearing the workpiece can be controlled by a programming device, for instance by a template guide.

In order to produce cut lines of a periodic nature, for instance sinusoidal or zig-zag cut lines, there is advantageously employed a combination of mechanical movement of the workpiece and electrical beam deflection.

Excellent cutting results have been obtained with the new cutting process in the case of sheets of a thickness of up to 5 mm., although thicker sheets may be cut by the new process.

The new cutting method can be applied very generally, for instance for the cutting of steel sheets of different composition, or else for the cutting of sheets of materials of very good heat conductivity, for instance of copper and silver. Similarly, cemented carbide plates can be readily cut. Since in the new cutting method the effect of the heat does not extend far into the material, i.e., since only a very small region of the material in the vicinity of the cutting plates is heated, parts of material which have been fully heat treated can also be readily cut. If the cut parts consist only of heat treated material, it is merely necessary to subject these parts to a slight additional mechanical machining in which a thin layer adjoining the cut line is removed.

The width of the cut may be controllably maintained small. For example, cuts have been made with a width of a few tenths of a millimeter, for instance 0.5 mm.

It has been found that the impinging beam of charge carriers must have an energy density of at least 1 mw./cm.$^2$ for cutting materials of the thicknesses and types set forth above. This value, however, depends on the material to be cut and on the manner in which the beam of charge carriers is controlled.

This invention will be more easily understood by reference to the following detailed description taken in combination with the accompanying drawings, of which:

FIG. 1 is a cross sectioned view of an apparatus for carrying out the method of the invention;

FIG. 2 is a plot of beam currents as a function of time for a pulsated beam;

FIG. 3 is a cross section view, to an enlarged scale, of the material during cutting thereof; and FIG. 4 is a perspective view of a coil spring made by the cutting method of this invention.

In FIG. 1 there is shown a beam generating apparatus in accordance with the present invention which comprises a cathode 1, control electrode 2 and a grounded anode 3. In the power supply 4, a high voltage of, for example, 150 kv. is produced and fed by a high voltage cable provided with a grounding jacket to the bias supply 5. This bias supply consists of a source 6 for producing the adjustable heating voltage, a source 7 for producing control pulses and a source 8 for producing the adjustable control cylinder bias voltage in conventional fashion.

These voltages are fed via a high voltage cable to the beam generating electrodes 1, 2 and 3.

The variation with time of the pulses of the beam of charge carriers produced is shown in FIG. 2. As shown by the curve 47, pulses are produced having a duty cycle ratio of 1:2, i.e., the duration of the pulse and the duration of the pauses between the pulses is equal. The duration of an individual pulse is in this connection preferably selected at $10^{-3}$ seconds.

Seen in the direction of the beam 25, there is provided below the anode 3 a diaphragm 9 which can be moved in the plane of the paper and perpendicular thereto by means of the knobs 10 and 11 respectively.

After adjustment of the intermittent electron beam 25, the latter passes through a grounded tube 15 and is focused by the electromagnetic lens 20.

Below the electromagnetic lens 20 there are arranged two deflection systems 23 and 27 which generate the fields necessary to controllably deflect the electron beam 25. By means of the deflection system 23, the electron beam 25 is first of all deflected at an angle to original direction and then enters the deflection system 27. The deflection system 27 so deflects the electron beam 25 that it impinges on the workpiece 26 parallel to the direction of the optical axis. Thus, the combination of the deflection system allows controllable displacement of the position of impingement while maintaining the direction of the beam parallel to the axis of the beam generator to ensure that the cut is not angled inadvertently.

By means of the generators 21 and 22, there are produced the adjustable deflection currents which serve to supply the deflection systems 23 and 27. An adjustable source 43 serves to provide the current for the electromagnetic lens 20. The latter focuses the electron beam 25 in such a manner that the point of its narrowest cross-section is, for example, 10 mm. above the surface of the workpiece 26. Such focussing provides a beam which diverges through the cut, aiding in material removal. If the beam converged, material removal would be slower.

In order to observe the progress of the cutting, there is provided an optical system which permits microscopic direct illumination of the workpiece 26. This system consists of an illuminating system 12 which supplies parallel-ray light. This light is reflected via two metallic prisms 13 and 14 onto a lens 17 which is displaceable in axial direction and focussed by the latter onto the workpiece. Below the lens 17, there is arranged a replaceable glass plate 18 which protects the lens 17 from possibly being dirtied by metal vapors. The lens 17 is moved, together with the glass plate 18, in axial direction by means of a knob 19.

The light reflected from or emitted by the surface of the workpiece 26 is focussed by the lens 17 and deflected via the mirror 16 into an observation system 49 developed as a stereomicroscope. In the grounded jacket 40 of the housing, there is arranged a plate 50 of X-ray protective glass which protects the observer from injurious radiations. The electron beam 25 passes through the opening of the deflection system 27 out of the housing 40 and into the working chamber 24. This working chamber is also provided with a conductive jacket and grounded. The working chamber 24 and parts of the housing 40 are preferably lined with lead plates in conventional manner to avoid the emergence of injurious X-radiation.

In the chamber 24 the workpiece 26 which is to be cut is arranged on a table which permits the movement of the workpiece relative to the electron beam. The workpiece 26 is held by means of a clamping table 29 which in its turn is arranged on a table 30. In order to move the table 30 in the plane of the paper, there is provided an electric motor 31 which is controlled via a programming device 32. The programming device 32 serves furthermore to control an electric motor (not shown) which moves the table 30 perpendicular to the plane of the paper.

The apparatus for the clamping of the workpiece is so developed that the workpiece may also be turned.

The programming device 32 contains for instance templates which serve, via potentiometer to translate mechanical displacement of the template into electrical signals, to control the electric motors which move the work table 30 along the coordinate axis.

If the electron beam 25 is energized, it passes through the workpiece 26, forming a narrow, highly heated zone. As can be noted from FIG. 3, the material which is liquefied thereby along the entire depth of the workpiece is vigorously ejected out of said zone in the direction of the beam, the liquid material which is thrown out forming spherical droplets 33. In this way, there is produced a cut 34 which completely separates the two halves of the workpiece 26a and 26b from each other. The place of the cut 34 has approximately parallel walls.

When cutting the workpiece 26, the ejection of the liquid metal parts 33 from the bottom of the workpiece 26 can be observed through the window 28 of the working chamber 24.

In the embodiment shown in FIG. 1, the clamping table 29 is developed to provide sufficient space between the workpiece 26 and the table 30 for solidification of the liquid material thrown out of the bottom of the workpiece before it strikes the table 30. In this manner, a build up of metal adhering to the table 30 is prevented and the small balls of metal are formed which may be easily removed.

In order to produce small cuts or to produce cut lines in the form of closed curves of a maximum diameter of up to a few centimeters, the table 30 can be stationary while the electron beam 25 is moved above the workpiece 26 by means of the two deflection systems 23 and 27.

To produce a cut line of periodic nature, the electron beam 25 is moved by one of the two deflection systems 23 or 27, for instance periodically at right angles to the plane of the paper, while the table 30 is moved slowly in the plane of the paper by the electric motor 31.

FIG. 4 shows a cylinder 35 of spring steel which has been cut along the spiral line 36 by the electron beam 25. In this way, there is produced a spiral spring which has the advantage that it still contains closed circles at its two ends. In this way, therefore, spiral springs can be produced which have a precisely predetermined diameter without any previous calculation.

By means of the new method, it is possible in economic manner to cut also materials which it is difficult to work. Furthermore, it is possible to produce curved sections of even small dimensions.

The new cutting method is particularly advantageous for producing punch cuts and cutting tools of steel or cemented metal carbide, and to produce extrusion press dies. Furthermore, by means of the new method, it is possible in a simple and economic manner to produce parts having curved edges for body or airplane production, as well as small cut-out parts. The new method serves furthermore for the production of shaped parts or machined parts of glass, ferrite, ceramic, carbided grinding materials, or sintered oxides, etc. As already mentioned, the new cutting process can also be used directly for cutting parts out of materials which have been fully heat treated.

The new method for cutting with a beam of charge carriers has been described with the use of electron beams, with reference to the drawings. However, it is also possible to use beams of charge carriers other than electron beams, such as for instance ion beams.

This invention may be variously embodied and modified within the scope of the subjoined claims.

What is claimed is:

1. The method of cutting material by an impinging beam of charge carriers which comprises the steps of adjusting the intensity of the beam to completely penetrate the material, to melt the material along the entire penetrating beam, and adjusting the beam diameter to eject the melted material from the material in the direction of the beam, and to move the point of impingement along the material in a cutting stroke.

2. The method in accordance with claim 1 which includes the step of intermittently pulsing said beam in a high duty cycle.

3. The method in accordance with claim 2 in which the duty cycle is regulated so that the duration of the pulses and the duration between pulses is equal.

4. The method in accordance with claim 2 in which the beam pulse duration is between $10^{-2}$ and $10^{-4}$ seconds.

5. The method in accordance with claim 1 in which said beam is focussed so that the narrowest cross section of the beam is slightly above the point of beam impingement on the material.

6. The method in accordance with claim 1 in which the movement of the point of impingement includes movement by deflection of the beam.

7. The method in accordance with claim 1 in which the movement of the point of impingement includes movement by movement of the material.

8. The method in accordance with claim 1 in which the beam intensity is adjusted to exceed 1 megawatt/cm.$^2$ at the impingement point.

References Cited in the file of this patent

UNITED STATES PATENTS

| | | |
|---|---|---|
| 2,902,583 | Steigerwald | Sept. 1, 1959 |
| 2,987,610 | Steigerwald | June 6, 1961 |